April 19, 1932.  L. H. WELLENSIEK  1,854,914
CORE DRILL
Filed Sept. 19, 1929    2 Sheets-Sheet 1

L. H. WELLENSIEK   INVENTOR

BY  Jesse R. Stone

ATTORNEY

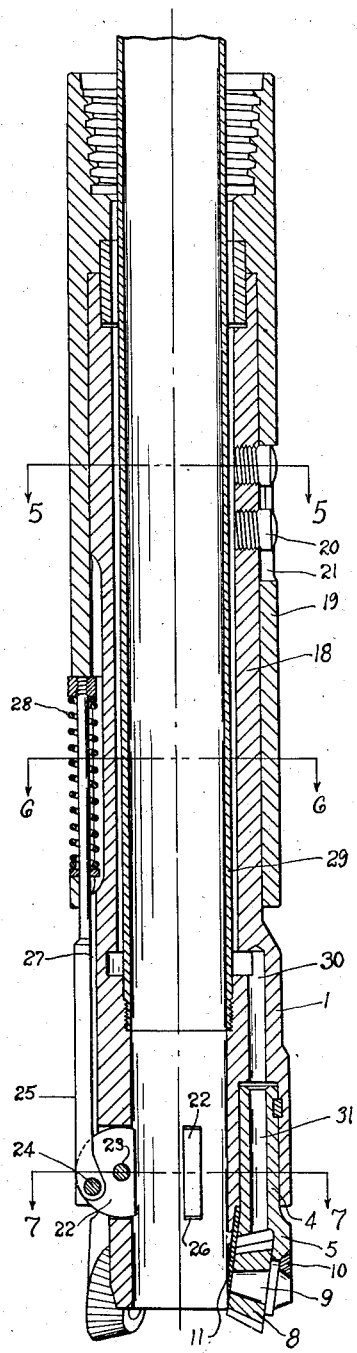
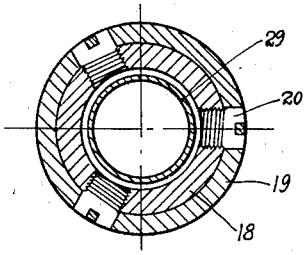
Fig. 5.
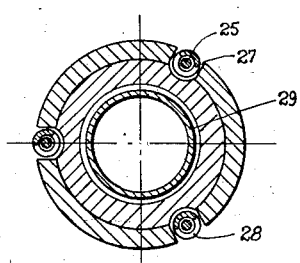
Fig. 6.
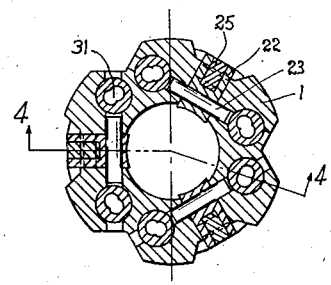
Fig. 7.
Fig. 4.
L. H. WELLENSIEK INVENTOR
BY Jesse R. Stone
ATTORNEY Patented Apr. 19, 1932

1,854,914

UNITED STATES PATENT OFFICE

LOUIS H. WELLENSIEK, OF HOUSTON, TEXAS, ASSIGNOR TO HUGHES TOOL COMPANY, OF HOUSTON, TEXAS, A CORPORATION OF TEXAS

CORE DRILL

Application filed September 19, 1929. Serial No. 393,602.

My invention relates to core drills such as are used in deep well drilling in hard formations. It pertains more particularly to roller drills in which the cutters are formed and mounted to roll upon the bottom of the hole.

It is an object of the invention to provide a core drill in which the cutters may be separately mounted upon shanks removably secured in the drill head, and hence capable of quick replacement in the field.

The invention includes the means by which the cutters are secured upon and held to their supports, and the particularly effective means by which said cutters are protected in their mounting.

An important object is to form the head and to mount the cutters thereon so that I can position the cutters well in advance of the body of the head, and still shroud the cutters for protection thereto.

I am also enabled to get an effective flow of the flushing fluid directly upon the cutters to flush them free of material thereon.

I also aim to form the drill so that the wall of the tubular head may be proportionately thin so as to enlarge the core barrel and yet secure a firm support for the cutters.

The cutters are also designed to be of small diameter, and still cut sufficient clearance for the drill head.

In the drawings herewith, Fig. 1 is a longitudinal section through a drill collar and drill equipped according to my invention, taken approximately on the plane 1—1 of Fig. 2.

Fig. 4 is a view similar to Fig. 1, but taken on the plane 4—4 of Fig. 7.

Figs. 5, 6 and 7, are transverse sections taken on the planes 5—5, 6—6, and 7—7, respectively, of Fig. 4.

I have shown my invention as applied to a roller core taking drill equipped with core taking means similar to that disclosed in my co-pending application No. 331,526 filed January 10, 1929. In prior structures of this character, it has been my practice to mount the cutters upon the lower portion of the head directly, and to screw the drill head to the drill body. This necessitates that the walls of the drill head be fairly thick, so that the core barrel must be small enough to fit therein.

In my present structure, the head 1 is made in one integral piece, and the lower end has a shoulder 2 in which sockets 3 are formed to receive posts 4 upon the cutter supporting elements. Inside the sockets 3, the wall of the head is tapered downwardly adjacent the cutter holders to form a slight support at 6 for the inner sides of the cutter supporting elements.

Figure 3:
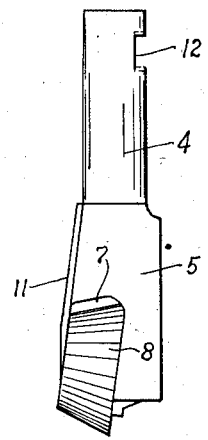
Fig. 3 is an elevational detail of the cutter and its mounting removed from the drill head.

The said cutter supports are illustrated in Fig. 3. There is a head 5 on the inner side of which are formed pockets 7 to house the cutters 8, which are of frusto-conical shape, and mounted upon cutter shafts 9 secured in an inclined position to the lower end of the holder. As the cutters must be secured in advance of the drill, it is expedient to weld the cutter shafts to the holders 5; and I have shown a bond of welding material 10 around the cutter shaft, the upper side of which unites with the body of the holder. The shaft may be otherwise constructed to form an integral part of the holder if desired, however.

Figure 1:
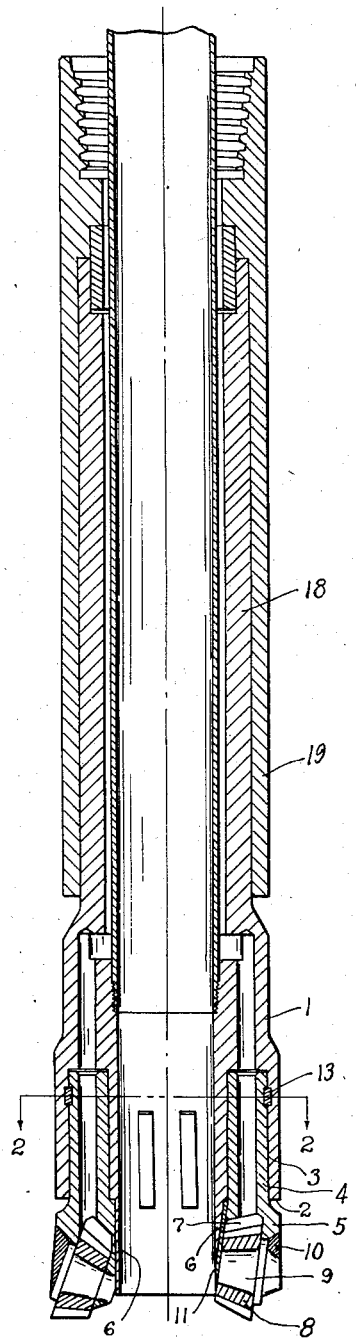

As will be seen from Fig. 1 there are two sets of cutters; one set is mounted on axes inclined upwardly toward the center of the drill, and the other set is mounted on pins inclined downwardly toward the axis of the drill. Both sets are mounted in the same manner, however, and one of the sets has an inner plate 11 secured to the head 5 of the holder so as to project along the inner side of the cutter to form part of the socket 7 and to bear against the inner end of the cutter shaft, and thus keep the flushing fluid from washing the core. The plate 11 may be welded or otherwise secured to the head. In the other set, the lower end of the cutter is inclined outwardly and no plate 11 is necessary.

Figure 2:
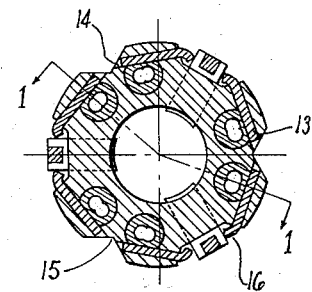
Fig. 2 is a transverse section on the plane 2—2 of Fig. 1.

The holder has the shank 4 shaped to fit the socket 3, and is therefore preferably cylindrical. Adjacent the upper end of the shank is a transverse groove 12 to receive a tapered locking key 13, which projects through openings 14 in the head and through said groove as seen in Fig. 2. The head 1 of the drill has longitudinal flutes 15 therein, and the openings 14 terminate in said flutes. The grooves 12 in the shanks 4 are tapered somewhat, as shown, and the keys 13 are also slightly tapered. When driven tightly in position the wedging effect of the pins draws the holders firmly into position, and the smaller ends of the keys are then bent over as shown at 16 to prevent removal in use.

The head 1 is extended upwardly, and has an elongated shank 18 telescoping within a drive sleeve 19, the upper end of which is adapted for connection with the drill stem. The driving connection between the shank 18 and the sleeve 19 is shown in Figs. 4 and 5. Two pins 20 screwed within the shank project into a slot 21 in the sleeve and prevent relative rotation. The slot is long enough to allow a limited longitudinal movement so as to operate the core catcher.

The core catcher includes dogs 22 set in slots 26 in the side of the head between the cutters and pivoted on axes 23. The dogs are moved by rods 25 connected at 24 to said dogs and extending upwardly in grooves 27 in the side of the head, and have a resilient engagement through springs 28 with the lower end of the sleeve 19. It will therefore be seen that the raising of the sleeve 19 relative to the shank 18, as allowed by the pin and slot engagement 20 and 21, will rotate the dogs into engagement with the core.

The flushing fluid passes downwardly between the core barrel 29 and the shank into passages 30 in the drill head and through registering passages 31 in the posts of the holders to the sockets 7 in which the cutters are mounted. It is to be noted that the flushing fluid has a comparatively straight passage from the drill stem to the cutters so that a strong stream of flushing fluid may be directed against the cutters, and as the cutters are housed, a strong nozzle effect of the fluid passage and the socket 7 will assure that the cutters are kept free of material.

In assembling my improved cutters, the cutters are separately mounted on their holders in the shop, and can be easily fixed in position in the drill head when desired. If a cutter becomes worn and needs replacement, the locking key 13 is removed and the holder 5 with its cutter thereon can then be withdrawn from the head and a new one inserted.

The great advantage of my improvement, however, lies in the fact that with this construction of drill head and the securing of the cutters thereon, I can mount the cutters so that they set well in advance of the head. Also the walls of the head may be thinner, thus allowing a larger core barrel and a larger core. Furthermore, the cutters may be of smaller diameter and can be well housed, to obtain better action of the flushing fluid.

What I claim as new is:

1. A core drill including a tubular head, having a plurality of sockets in its forward end, cutter holders, posts on said holders shaped to fit said sockets, transverse locking keys engaging said posts, pockets in the lower ends of said holders, cutter pins supported in a bond of welding material on said holders, and cutters on said pins in said pockets.

2. A core drill including a tubular head, having sockets in its lower end, cutter holders, posts thereon secured in said sockets, rotatable cutters mounted on the lower ends of said holders, and means on said holders to house the inner sides of said cutters.

3. A core drill including a tubular head, having sockets in its lower end, cutter holders, posts thereon secured in said sockets, rotatable cutters mounted on the lower ends of said holders, inclined cutter shafts for said cutters, and plates on said holders bearing against the inner ends of each of said shafts and serving to house the inner sides of said cutters adjacent the core.

4. A core drill including a tubular head, having sockets in its lower end, cutter holders, posts thereon secured in said sockets, rotatable cutters mounted on the lower ends of said holders, and plates secured to the inner sides of said holders to house the inner sides of said cutters adjacent the core.

5. Cutter holders for core bits adapted to be removably secured thereto, said holders including a head, a post, said head having a lower socket, a cutter shaft and a cutter thereon, said shaft being welded on its upper side to the lower end of said head, and a plate secured to said head and adapted to bear against the inner side of said cutter and said shaft.

6. A core bit including a tubular head having comparatively thin walls, cutter holders, posts on said holders held detachably within sockets in said head, and cutters mounted on said holders to project in advance of the head, said cutters being housed on their inner sides.

In testimony whereof, I hereunto affix my signature, this the 16th day of September, A. D. 1929.

LOUIS H. WELLENSIEK.